United States Patent [19]

Sone et al.

[11] Patent Number: 5,109,480

[45] Date of Patent: Apr. 28, 1992

[54] DRAWING PROCESSOR INCLUDING ARITHMETICAL UNIT FOR IMPROVED SUPERPOSED PICTURE DISPLAY

[75] Inventors: Takashi Sone, Tokyo; Jun Sato, Musashino, both of Japan

[73] Assignee: Hitachi, Ltd., Tokyo, Japan

[21] Appl. No.: 448,924

[22] Filed: Dec. 12, 1989

[30] Foreign Application Priority Data

Dec. 20, 1988 [JP] Japan ................................ 63-323001

[51] Int. Cl.$^5$ ................................................ G06F 3/14
[52] U.S. Cl. .................................. 395/131; 340/703; 364/749; 364/786
[58] Field of Search ............... 340/701, 721, 734, 750; 364/518, 521, 522, 749, 786

[56] References Cited

U.S. PATENT DOCUMENTS

| | | | |
|---|---|---|---|
| 4,393,468 | 7/1983 | New | 364/749 X |
| 4,707,800 | 11/1987 | Montrone et al. | 364/749 X |
| 4,768,160 | 8/1988 | Yokoyama | 364/749 X |
| 4,860,248 | 8/1989 | Lumelsey | 364/521 X |
| 4,862,150 | 8/1989 | Katsura et al. | 364/521 X |
| 4,933,878 | 6/1990 | Guttag et al. | 364/521 |

FOREIGN PATENT DOCUMENTS

| | | |
|---|---|---|
| 55-63434 | 5/1980 | Japan . |
| 57-164334 | 10/1982 | Japan . |
| 63-88683 | 4/1988 | Japan . |

OTHER PUBLICATIONS

Blaauw GA, "Very Operation," IBM Technical Disclosure Bulletin, vol. 4, No. 3, Aug. 1961, pp. 46–48.
Rosenfeld JL, "Variable-Width Adder for Microprogrammed Computers Used for Emulution," IBM Technical Disclosure Bulletin, vol. 15, No. 4, pp. 149–50.
Mevo M., Computer System Architecture, Prentice-Hall Inc., 1976, pp. 244–249.
Kazuo Minorikawa, et al., "A CRT Controller with a Variety of Commands Such as PAINT and COPY, and Which can Specify Drawing Positions with Coordinates", Thesis—May 21, 1984, published by Nikkei McGraw-Hill Kabushiki-Kaisha, pp. 221–254.
An English translation is provided.

Primary Examiner—David L. Clark
Attorney, Agent, or Firm—Fay, Sharpe, Beall, Fagan, Minnich & McKee

[57] ABSTRACT

A color graphic display system is disclosed including a drawing process for displaying video data on a display device wherein the data is particularly intended to include superposed pictures. The processor includes an arithmetical operation unit which will allow addition/subtraction of video data items representative of the picture elements to be superposed. Further included is a condition setting circuit for selectively inhibiting carrys or borrows during the arithmetic operations between selected bits of a data word representative of an element such as a pixel of the picture being displayed. More particularly, where a video data item is comprised of sets of bits each set of which is representative of a main color of the pixel, and when two video data items are added or subtracted, the carrys that may normally occur between the different sets are inhibited to avoid interference between the sets that may affect the color of the resulting video data item. A carry look-ahead circuit is also provided for improved processing speed of the system. An overflow prevention circuit is disclosed for forcibly switching selected bits of the video data item to a preselected value upon determining that an operated result has given rise to an overflow.

15 Claims, 7 Drawing Sheets

DRAWING PROCESSOR INCLUDING ARITHMETICAL UNIT FOR IMPROVED SUPERPOSED PICTURE DISPLAY

BACKGROUND OF THE INVENTION

1 Field of the Invention

The present invention relates to display control technology, and more particularly to effective techniques for improving a color graphic display system. It is effectively utilized for, e.g., a drawing processor or graphic controller which has a pattern data drawing function for a video memory that holds video data in conformity with a bit map system.

2 Description of the Prior Art

In recent years, in a graphic display system having a raster scanning type CRT display device by which a complicated pattern is displayed in colors, there has come into use a drawing processor or a graphic controller of multiprocessor architecture which has the function of drawing video data for a video memory (frame buffer) of the bit map type wherein the video data items are formed on the basis of pattern information stored in a main memory on a host side and are held in one-to-one correspondence with pixels on the display screen of the CRT. Some of such graphic controllers have the function of superposing two pictures by the use of the functions of a logical operation unit ("NIKKEI ELECTRONICS" published by Nikkei McGraw-Hill Kabushiki-Kaisha, dated May 21, 1984, pp. 221-254).

PROBLEMS TO BE SOLVED BY THE INVENTION

In the color graphic display system, the display of the video data has its hues determined by the mixing ratios of the three primary colors of red, green and blue. In such processing when superposing at least two pictures, operations need to be executed for adjustment of the pattern information for video data items representative of the respective colors of the three primary colors, as opposed to executing operations for respective pixels each of which forms the smallest unit of the picture.

For the color graphic display, there is a system and method wherein the video data for a single pixel is configured of a plurality of successive bits such as 8 bits to 16 bits, and wherein the bits constituting the data of the single pixel are divided in the three primary colors, thereby to assign 2 bits or 4 bits to the information of each color. This method poses no problem when logical operations such as OR and AND are adopted as the sorts of the operations in the superposition processing. The inventor, however, has noticed the disadvantage that, when addition and subtraction are employed, a carry and a borrow arise between the bits, so interferences take place among the three primary colors.

Such a problem is not present when the operations in the superposition are limited to the logical operations only. However in order to present a more copious color display, use of only logical operations is insufficient.

An object of the present invention is to provide, in a color graphic display system, a drawing processor which realizes a more copious color display.

Another object is to provide a color graphic display system having superposition processing including arithmetical processing of video data items representative of pixel display colors that avoids pixel color interference.

The above and other objects and novel features of the present invention will become apparent from the description of this specification when read in conjunction with the accompanying drawings.

BRIEF SUMMARY OF THE INVENTION

In a color graphic display system, a carry or borrow is prevented from being transmitted between color information items, whereby a copious color display can be presented while interferences among three primary colors are prevented.

A drawing processor is provided that comprises, not only a logical operation unit for executing the logical operations of video data, but also an arithmetical operation unit. The arithmetical operational unit includes digital arithmetic circuitry in which digital unit adders are connected in series for digitally adding or subtracting every bit composing the video data information items. Switches are connected between the respectively adjacent unit adders to propagate or intercept a carry signal from a lower bit to an upper bit. Condition setting means, such as a register adapted to be externally set, generate control signals for the respective switches. More particularly, a plurality of adder circuits each composed of a desired number of bits can be constructed in such a way that paths for propagating the carry signals between any of the unit adders constituting the arithmetic circuitry are blocked by externally setting conditions in the condition setting means. The processing of adding or subtracting the information items of each of three primary colors is executed in each of the distinct adder circuits, so as to avoid the transmission of a carry or a borrow between the color information video data items. Thus, it is possible to accomplish the aforementioned object that the copious color display is realized while the interferences among the three primary colors are prevented.

DETAILED DESCRIPTION OF THE PREFERRED EMBODIMENTS

Figure 1:
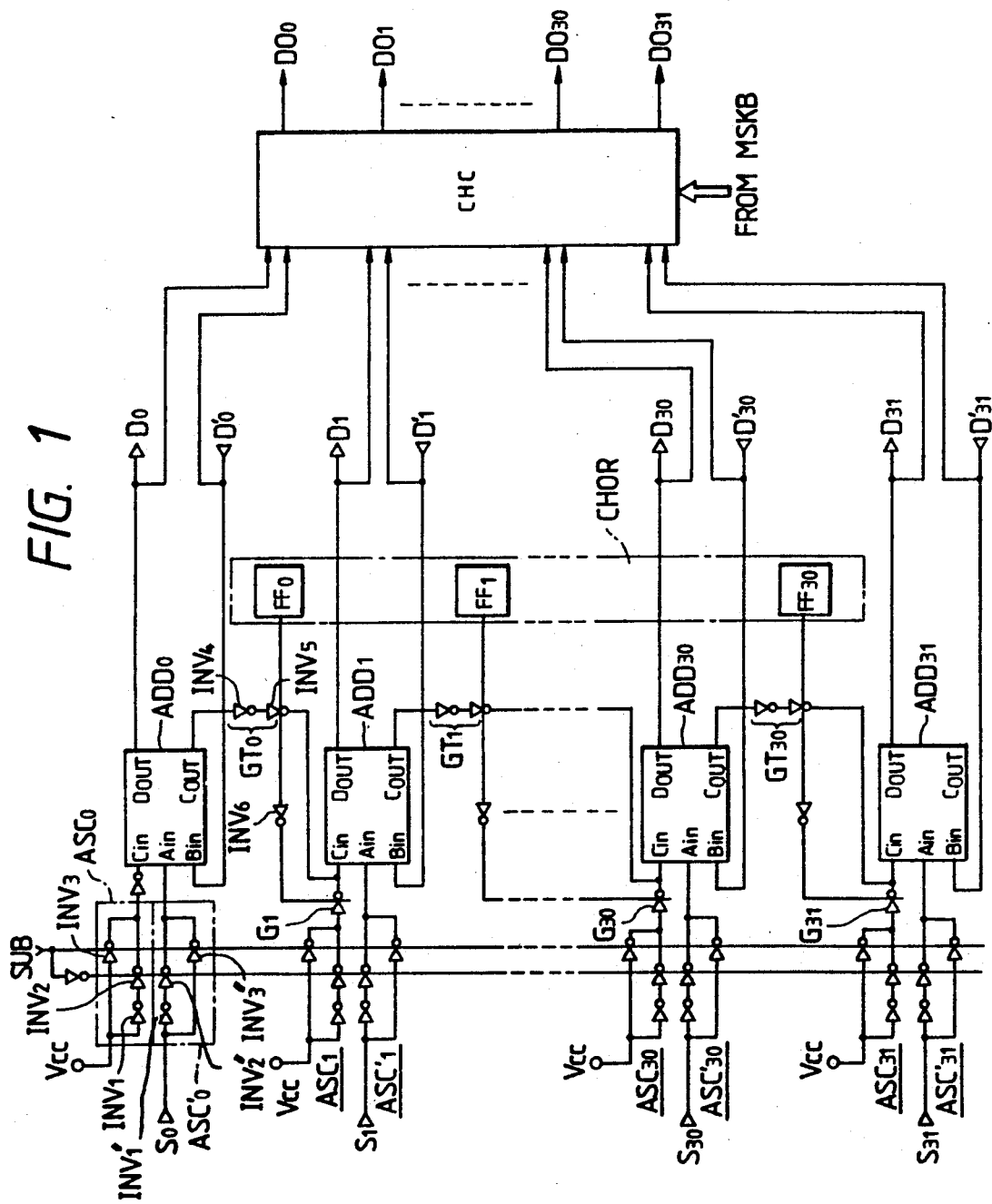
FIG. 1 is a logic circuit diagram showing an embodiment of an arithmetical operation unit which is built in a drawing processor according to the present invention.

Referring now to the drawings wherein the showings are for purposes of illustrating the preferred embodiments of the inventions only and not for purposes of limiting same, the FIGURES show a color graphic display system which realizes a more copious display with superposed pictures.

Figure 2:
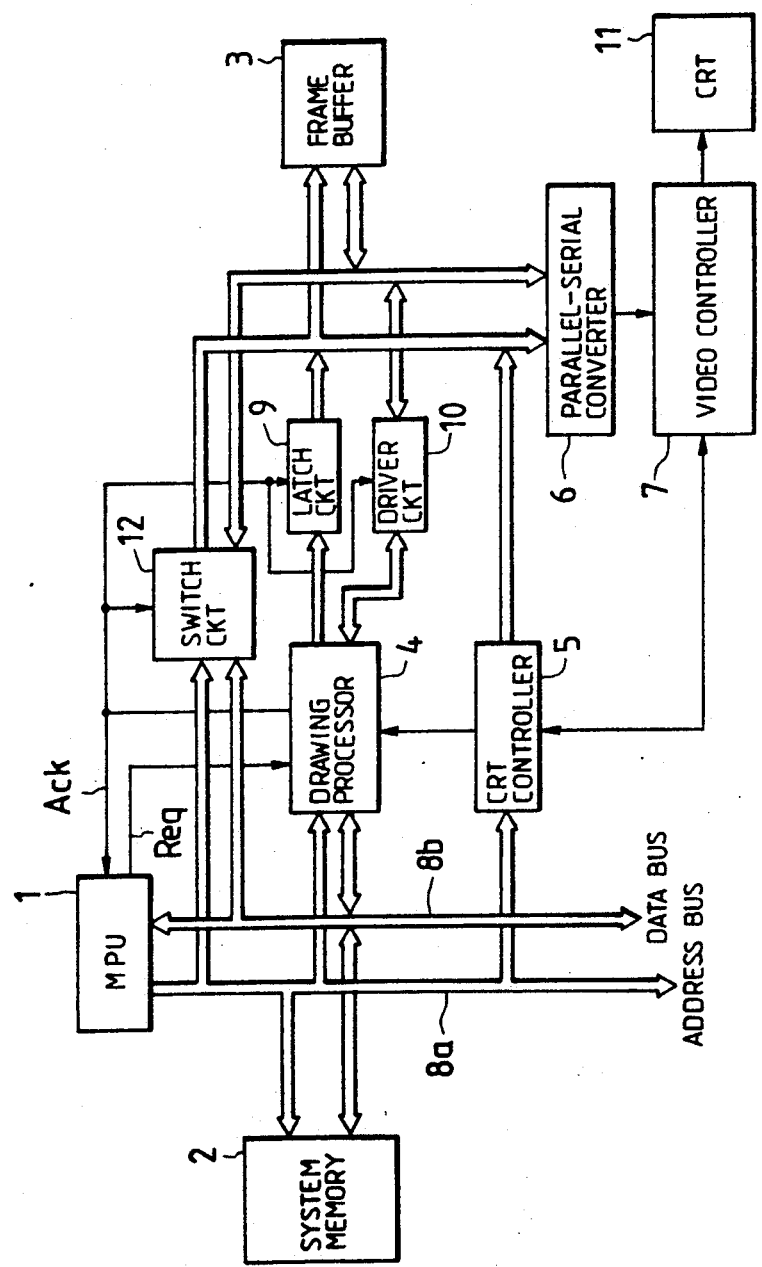
FIG. 2 is a block diagram showing an example of construction of a color graphic display system which employs the drawing processor.

FIG. 2 shows an example of a graphic display system which uses a drawing processor according to the present invention.

This system includes a microprocessor (hereinbelow, termed "MPU") 1; a system memory 2 comprising a ROM (read only memory) which stores a system program or/and various items of data therein and a RAM (random access memory) which serves as a work area when the MPU 1 operates; a frame buffer 3 comprising a video memory in which display picture data to be displayed on a CRT display device 11 is stored in correspondence with pixels; a drawing processor 4 which writes the display picture data into the frame buffer 3 on the basis of a command from the MPU 1; a CRT controller 5 which reads out the display picture data held in the frame buffer 3, in order to endow the CRT display device 11 with video data; a parallel-serial converter 6 which forms video signals on the basis of the display picture data read out of the frame buffer 3 and then delivers them as outputs; and, a video controller 7 which realizes the functions of coloring and scrolling the video signals, etc. Incidentally, symbols 8a and 8b denote the address bus and data bus of the system, respectively. For brevity of illustration, a bus for transmitting control signals (a control bus) is not shown in the figure.

In this embodiment, although no special restriction is meamant, a drawing address which is output from the drawing processor 4 is latched in a latch circuit 9 and is supplied to the frame buffer 3 as an address signal. In addition, drawing data is written into the frame buffer 3 or read out therefrom through a driver circuit 10 by the drawing processor 4. Further, in this embodiment, the frame buffer 3 is also connected to the system buses (8a, 8b) through a switch circuit 12, through which the MPU 1 can directly access the frame buffer 3 and draw a picture thereinto while circumventing the drawing processor 4.

In directly accessing the frame buffer 3, the MPU 1 delivers a request signal Req to the drawing processor 4. In response to the request signal Req, the drawing processor 4 supplies the MPU 1 with an acknowledge signal Ack which indicates the grant of access to the frame buffer 3. The latch circuit 9, driver circuit 10 and switch circuit 12 are controlled by the acknowledge signal Ack. More specifically, in the case where the frame buffer 3 is directly accessed by the MPU 1, the switch circuit 12 is activated, and the latch 9 and driver 10 are brought into inactive states. In contrast, in the case where the frame buffer 3 is accessed by the drawing processor 4, the latch 9 and driver 10 are activated, and the switch circuit 12 is inactivated.

Although not especially restricted thereto, the various blocks shown in FIG. 2 may be mounted and interconnected on a single printed-wiring circuit board or a plurality of such circuit boards which are to be electrically coupled to one another.

The drawing processor 4 functions to calculate the drawing address and drawing data in accordance with a predetermined drawing algorithm, and to execute drawing processing conforming to a command supplied from the MPU 1 through the system bus 8b. By way of example, the drawing processor 4 responds to the command from the MPU 1 to generate a drawing address signal conforming to this command, and to form the drawing data which is to be written into the address of the frame buffer 3 designated by the drawing address signal. The drawing address signal and drawing data thus formed are supplied from the drawing processor 4 to the frame buffer 3 through the latch 9 and driver 10, respectively, as described above.

In displaying the picture, the CRT controller 5 forms an address signal and applies it to the frame buffer 3. Then, the frame buffer 3 supplies the parallel-serial converter 6 with the display data held in its address conforming to the display address signal. As a result, the data held in the address designated by the display address signal is displayed on the CRT device 11

Figure 3:
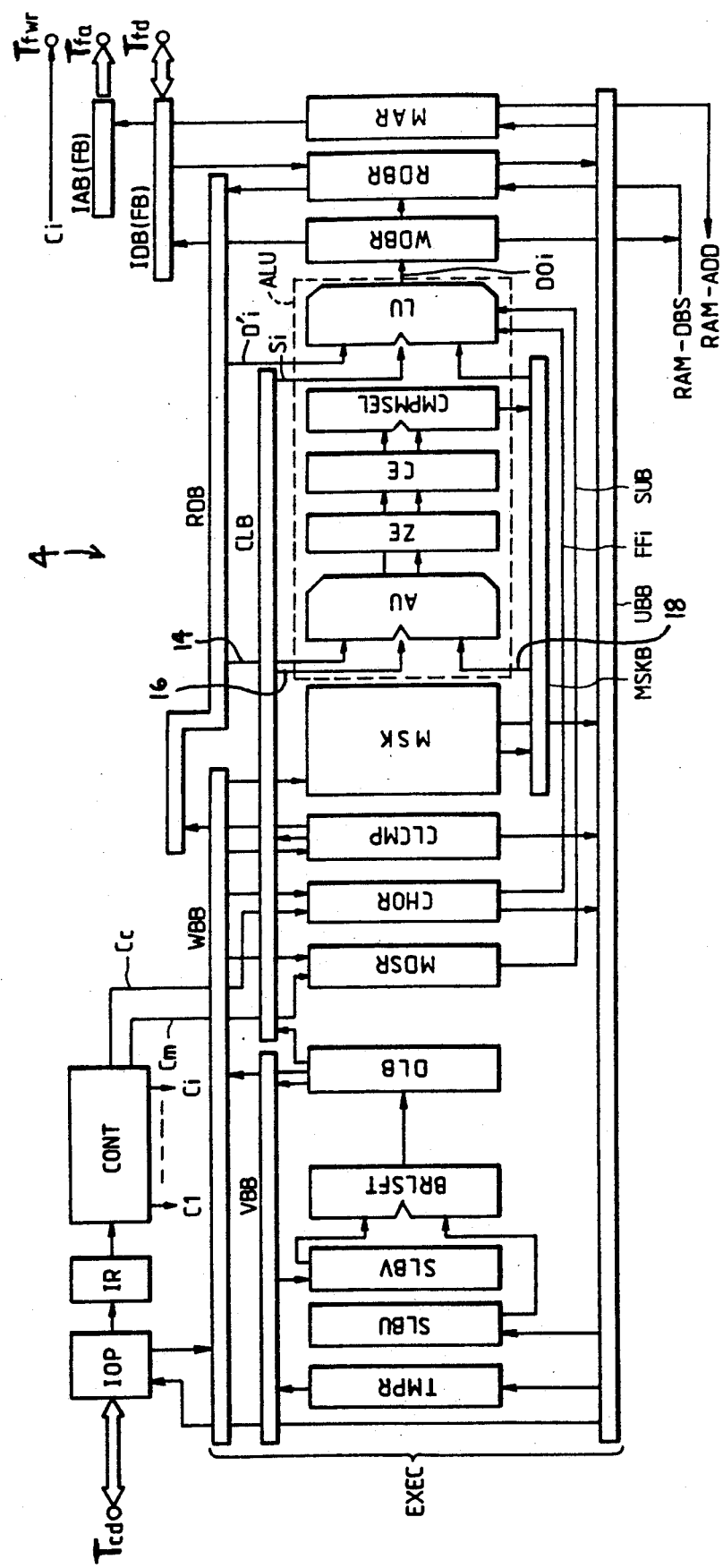
FIG. 3 is a block diagram showing an example of construction of an execution unit which has a video data processing function and which is included in the drawing processor.

FIG. 3 illustrates an embodiment of the drawing processor 4. For brevity of illustration, only a portion of the processor necessary for realizing the function of drawing two pictures in superposition is especially shown in detail in the figure.

Although not especially restricted thereto, the drawing processor 4 of this embodiment may be typically formed on a single semiconductor chip such as of single-crystal silicon by known techniques for manufacturing semiconductor integrated circuits. That is, various circuit blocks shown in the figure are formed on a single chip by known manufacturing techniques. In the figure, marks "o" indicate external terminals which are connected to the chip. For brevity of illustration, even a signal having a plurality of bits may be sometimes depicted by a single signal line.

Referring to FIG. 3, symbols SLBU and SLBV denote source data registers, which hold the video data information of pixels for a one of the pictures when the pictures are to be superposed. Together the source data registers SLBU and SLBV store the data corresponding to 2 long words. Symbols UBB and VBB denote internal data buses, each of which has a bus width of 32 bits (one long word), so that data can be transferred in a 32-bit unit between the frame buffer 3 and the aforementioned source data registers. Each of the source data registers SLBU and SLBV is constructed of a register adapted to hold data of 32 bits, whereby the source data of the 2 long words is stored therein in 2 cycles.

The drawing processor 4 operates to fetch from an instruction register IR an instruction code or drawing command sent through the data bus 8b from the MPU 1, and decodes it by means of a control circuit CONT, thereby to generate control signals $C_1$-$C_i$, $C_c$ and $C_m$ for an execution unit EXEC. Thus, the execution unit EXEC is sequentially actuated to execute an operation specified by the instruction code or drawing command.

When the drawing processor 4 is given the instruction code for executing a superposed drawing, the control signals conforming to this instruction code are formed. In response to the control signals formed, the source area of the frame buffer 3 (FIG. 2) is accessed, and data is derived from the buffer 3 in 32-bit units. More specifically, a memory address register MAR holds therein an address signal for designating that address of the frame buffer 3 which holds data including pixel video data information corresponding to a predetermined one of a plurality of pixels constitutive of one of the pictures to be displayed in superposition on each other. The address signal held is supplied to the frame buffer 3 through an address bus IAB for this frame buffer and an external address terminal $T_{fa}$. The frame buffer 3 is accessed by the address signal, whereupon the data held in the address designated by the address signal (including the pixel data corresponding to the predetermined pixel in one of the pictures) is loaded in a read data register RDBR through an external data terminal T$_{fd}$ coupled to the frame buffer 3 and a data bus IDB. The data loaded in the read data register RDBR is loaded in a temporary register TMPR through the internal bus UBB. For the purpose of boundary processing to be described later, the next data corresponding to 1 long word is similarly loaded in the read data register RDBR and then loaded in the source data register SLBU through the internal bus UBB. More specifically, the address signal held in the memory address register MAR is subjected to, for example, +1 increment and is supplied to the frame buffer 3 as stated above. The frame buffer 3 is accessed by the incremented address signal, whereupon data held in the next address is read out and is loaded in the read data register RDBR as stated above. At this time, the preceding data of 1 long word stored in the temporary register TMPR is transferred to the source data register SLBV through the internal bus VBB. Thus, the data corresponding to 2 long words are loaded in both the source data registers SLBU and SLBV.

In this manner, according to the embodiment, the data of 2 long words concerning a source is read out of the frame buffer 3 for the purpose of the boundary processing with destination data. More concretely, in a case where source data SD is composed of pixel video data items ①-⑤ astride 2 long words as shown in FIG. 4, the source data SD1 of one long word including the pixels ① thru ③ and the source data SD2 of the other long word including the pixels ④ and ⑤ are respectively loaded in the source data registers SLBU and SLBV.

Figure 4:
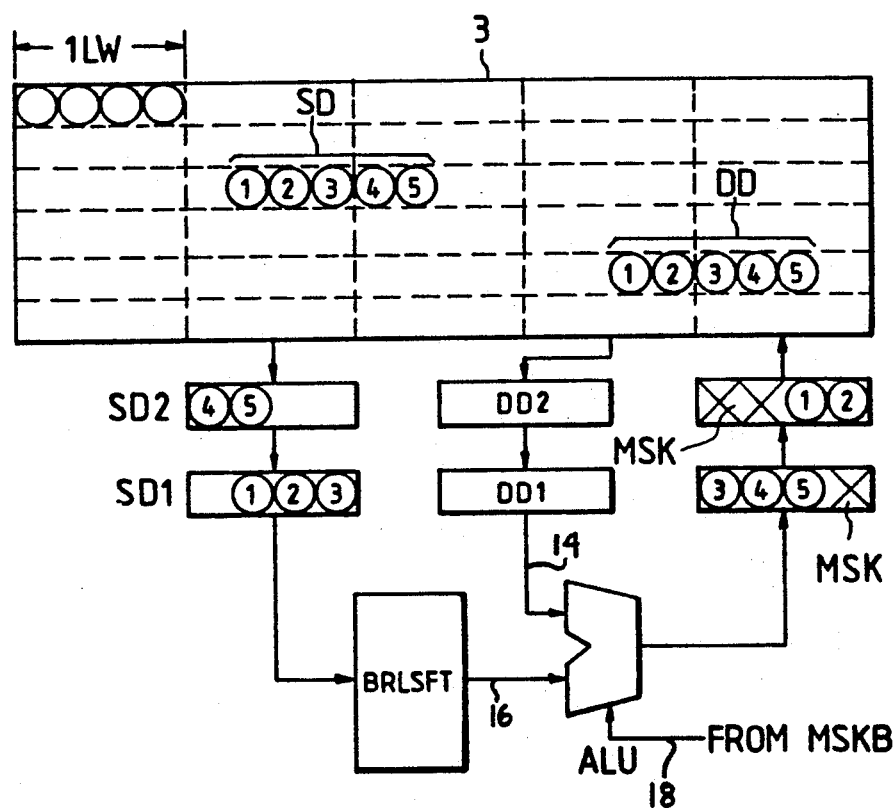
FIG. 4 is an explanatory diagram showing the procedure of boundary processing which is executed by the execution unit having the video data processing function.

Here in FIG. 4, the arrayal of the pixel data in the frame buffer 3 is illustrated, and symbol 1LW denotes data of 1 long word. As seen from the figure, 1 long word can hold the data corresponding to 4 pixels.

The source data SD is data constituting one of the pictures to be superposed and displayed, while the destination data DD to be described below is data constituting the other picture. In a case where the pixel data constituting the other picture, namely, the destination data DD is composed of a long word including pixels ① and ② a long word including pixels ③ thru ⑤, the pixels ① and ② of the source data SD1 are shifted by a barrel shifter BRLSFT so as to be merged with the destination data DD1 (including the pixels ① and ②). In other words, and by way of example, in order to merge the SD pixels ① and ② with the DD pixels ① and ②, the long word SD1 having SD pixels ① and ② must be shifted to the BRLSFT. Such an output signal from the barrel shifter BRLSFT is supplied to a register DLB (FIG. 3). The output signal of the barrel shifter BRLSFT supplied to the register DLB is selectively transmitted to internal buses VBB, WBB and CLB in accordance with the control signals from the control circuit CONT.

The destination data DD constituting the other picture is divided into the destination data item DD1 of the long word including the pixels ① and ② and the destination data item DD2 of the long word including the pixels ③-⑤, and these data items are fetched from the frame buffer 3 into the drawing processor 4. More specifically, an address signal designating that address of the frame buffer 3 which holds the destination data item DD1 is held in the memory address register MAR (FIG. 3). The address signal held is sent to the frame buffer 3 through the internal address bus IAB as well as the external address terminal T$_{fa}$, whereby the destination data item DD1 is read out and is loaded in the read data register RDBR through the external data terminal T$_{fd}$ as well as the internal data bus IDB. The destination data item DD1 loaded in the read data register RDBR is supplied to the first input node 14 of an arithmetic-logic unit ALU through an internal read data bus RDB. At this time, the second input node 16 of the arithmetic-logic unit ALU is supplied with the output of the register DLB through the internal color bus CLB which has been selected by the control circuit CONT. On this occasion, the register DLB is loaded with the source data SD1 which has been shifted a predetermined amount by the barrel shifter BRLSFT. The amount of the shift by the barrel shifter BRLSFT is determined by, for example, a command given to the drawing processor 4 beforehand. That is, the barrel shifter BRLSFT shifts the source data SD1 in accordance with the command so that the data of the long word including the pixels ① and ② may be supplied to the second input node of the ALU. In addition, the third input node 18 of the arithmetic logic unit ALU is supplied with mask data from a mask register MSK through an internal mask bus MSKB. The arithmetic-logic unit ALU executes operations between the destination data item DD1 and the shifted data item SD1 from the register DLB for those bits which are not designated by the supplied mask data so as to be masked, while it delivers the destination data item DD1 as its output for those bits which are designated by the mask data so as to be masked. Such outputs from the arithmetic-logic unit ALU are supplied to a write data register WDBR. In the example shown in FIG. 4, the operations are executed between the pixels ① and ② within the source data SD and the pixels ① and ② within the destination data DD, and the results thereof are supplied to the write data register WDBR. In this case, the pixels (marked "xx") of the destination data item DD1 to be masked are designated as the 2 pixels on the left side viewed in the figure, and they are supplied to the write data register WDBR. The data supplied to the write data register WDBR is sent to and written into the address of the frame buffer 3 designated by the address signal held in the memory address register MAR (the address signal pointing to the address of the destination data DD1), through the internal data bus IDB as well as the external data terminal T$_{fd}$.

Subsequently, the address signal held in the memory address register MAR is subjected to +1 increment by way of example. Thus, the frame buffer 3 is given the address signal which points to the address thereof holding the destination data DD2. In consequence, the read data register RDBR is supplied with the destination data item DD2 read out of the frame buffer 3. On the other hand, the register DLB is supplied with the source data having been shifted by the barrel shifter BRLSFT. The amount of the shift by the barrel shifter BRLSFT is determined by data from the control circuit CONT.

The shift amount of the barrelshifter BRLSFT may well be set in the following way, a mode for setting the shift amount of the barrel shifter is established by a command. In this mode, the barrel shifter is coupled to the internal data bus WBB, and the input/output circuit IOP is brought into an input status. Data from the microprocessor MPU is supplied as shift amount data to the barrel shifter through the I/O circuit IOP as well as the internal data bus WBB, whereby the shift amount of the barrel shifter is set.

Incidentally, the I/O circuit IOP is coupled to the MPU 1 through the external data terminal $T_{cd}$, thereby functioning to transmit a command or instruction code to the instruction register IR, to transmit data from the MPU 1 to the internal write bus WBB, or to transmit internal data on the internal bus UBB to the MPU 1. Although not especially restricted thereto, the operation of the I/O circuit IOP (such as the change-over between the input and output statuses thereof, or the determination of the transfer destination of an output signal) is controlled by the control circuit CONT.

In addition, the control signal (a read/write signal for the frame buffer 3) $C_i$ formed by the control circuit CONT is supplied to the frame buffer 3 through an external terminal $T_{fwr}$. By way of example, the read/write signal $C_i$ is set at a high level in the case where the source data and the destination data are to be read out of the frame buffer 3, and it is set at a low level in the case where the data obtained by the operations in the drawing processor 4 (the destination data) is to be written into the frame buffer 3. Although not especially restricted thereto, the read/write signal $C_i$ is supplied to the read/write terminal of a memory (not shown) constituting the frame buffer 3.

In the example of FIG. 4, the data including the pixels ③-⑤ is supplied to the register DLB. As in the foregoing, the destination data DD2 of the read data register RDBR and the output of the register DLB are supplied to the arithmetic-logic unit ALU. Also, mask data held in the mask register MSK is supplied to the ALU. The arithmetic logic unit ALU executes operations between the destination data item DD2 and the output data from the register DLB for those bits which are not designated by the mask data to be masked (in the example of FIG. 4, these are the bits of the pixels ③-⑤), while it delivers the destination data item (marked "x") left intact as regards a bit which is designated so as to be masked. As in the foregoing, such output data delivered from the arithmetic-logic unit ALU is transmitted to the write data register WDBR. The data supplied to the write data register WDBR is written into the frame buffer 3 again. That is, it is rewritten into the address of the frame buffer 3 having held the destination data item DD2, as described before.

In this way, the processing of the superposition operations between the two pictures is carried out, and the processed result is written into the frame buffer 3 again. The video data items in the frame buffer 3 obtained by such processing are sequentially read out by the CRT controller 5 so as to be displayed on the CRT device 11.

By way of example, the setting of the mask data in the mask register MSK proceeds as follows: First, the operation of write into the mask register MSK (FIG. 3) is instructed by a command or an instruction code. According to the command, the control circuit CONT selects the mask register MSK, and it brings an input-/output circuit IOP into an input mode so that data from the microprocessor MPU may be supplied to the internal write bus WBB through an external data terminal $T_{cd}$ for the MPU 1 and the I/O circuit IOP. The data supplied to the internal write bus IWBB is set as the mask data in the selected mask register MSK. Although not necessarily limited thereto, the mask register MSK is configured of two registers each of which has a bit width corresponding to one long word. One of the two registers is used for the processing between the destination data item DD1 and the source data, while the other is used for the processing between the destination data item DD2 and the source data.

In the above example, the source data item SD1 is held in the source data register SLBV, and the source data item SD2 is held in the source data register SLBU, whereupon the source data SD (SD1 and SD2) held in the source data registers SLBV and SLBU is shifted the predetermined amount by the barrel shifter BRLSFT. The shift amount is determined in relation with the destination data, and by data (not shown) supplied from the control circuit CONT to the barrel shifter BRLSFT. The source data of 2 long words obtained by the shift operation is supplied to the register DLB, from which the source data items divided into 1 long word are separately supplied to the input node of the arithmetic-logic unit ALU. That is, the source data items each corresponding to 1 long word are respectively supplied from the register DLB to the ALU in agreement with the timings of supplying the destination data items DD1 and DD2 to the ALU.

The present invention, however, is not restricted to only the above method. By way of example, a method to be described below may also preferably be adopted.

First, dummy data having a predetermined value is set in the source data register SLBV, while the source data SD1 is set from the read data register RDBR in the temporary register TMPR. Subsequently, the dummy data of the source data register SLBV is transferred to the source data register SLBU, while the source data SD1 of the temporary register TMPR is transferred to the source data register SLBV. Data which consists of the dummy data and the source data SD1 respectively set in the source data registers SLBU and SLBV is shifted by the barrel shifter BRLSFT, thereby to obtain the source data of 1 long word having the pixel data items ① and ② on the right side, and this source data is transmitted to the internal bus (for example, CLB) through the register DLB. The source data SD2, for example, is set in the temporary register TMPR at this time. At the next step, the source data SD1 having been set in the source data register SLBV is transferred to the source data register SLBV, and the source data SD2 having been set in the temporary register TMPR is transferred to the source data register SLBV. The source data SD (SD1 and SD2) thus set in the source data registers SLBU and SLBV is shifted by the barrel shifter BRLSFT, thereby to obtain the source data of 1 long word having the pixel data items ③, ④, and ⑤ on the left side. The source data obtained is transmitted to the internal bus (CLB) through the register DLB. Also in this case, the amount of the shift by the barrel shifter BRLSFT is determined by data from the control circuit CONT. As stated before, the output of the register DLB is transmitted to any of the internal buses VBB, WBB, and CLB in accordance with the control signals delivered from the control circuit CONT. By way of example, in a case where color operations are to be executed between the two pictures, the output of the register DLB is transmitted to the internal color bus CLB by the control signals which are delivered from the control circuit CONT in accordance with a command, and it is supplied therefrom to a color comparison operation circuit AU and a picture operation circuit LU which are included in the arithmetic-logic unit ALU.

With continued reference to FIG. 3, the color comparison operation circuit AU executes various color operations in long-word units. For example, it detects the coincidence between color information which is designated by a color comparison register CLCMP and that color information of a pixel which is expressed by source data read out of the frame memory 3 and then shifted a predetermined amount by the barrel shifter BRLSFT, or it decides the relation between the magnitudes of the color information items. Also, it compares the data of a destination and the source data. Further, it compares the color information of a pixel expressed by the data of the destination and the color information designated by the color comparison register CLCMP. A zero extension circuit ZE processes a coincident result in pixel unit. More specifically, one pixel is composed of a plurality of bits, and hence, in a case of detecting the coincidence between two pixels (or between the data of the comparison register and a pixel), it is necessary to check whether or not the corresponding bits coincide between the pixels. The zero extension circuit ZE detects that the pixels are entirely coincident in bit unit. Of course, it performs the detection between the data of the comparison register and the pixel (source data or destination data).

By way of example, the setting of the color information in the color comparison register CLCMP is executed in such a way that a command to the effect of setting the color information from the microprocessor MPU is sent to the drawing processor 4. In response to the command, the control circuit CONT selects the color comparison register CLCMP and brings the input/output circuit IOP into the input mode. Thus, data subsequently supplied from the MPU 1 is set as the color information in the color comparison register CLCMP.

The color comparison operation circuit AU is used for, e.g., "no operation" (subjecting a pixel to no operation) for the pixel (the pixel in a picture) identical in color to a surface which serves as the foundation of the picture to be displayed, and the extraction of the data of a color designated by the color comparison register CLCMP. By way of example, the pixel of the color designated by the color comparison register CLCMP is removed from among a plurality of pixels to be displayed. That is, it is not written into the frame buffer 3. A carry extension circuit CE processes a carry signal in the comparison of the magnitudes mentioned above. The output signal of the color comparison operation circuit AU is delivered to the internal mask bus MSKB through a selector CMPMSEL in accordance with a color comparison mode. Thus, the output signal of the color comparison operation circuit AU can be used as mask data instead of the content of the mask register MSK. The comparison mode is determined by data defined by a plurality of bits written in a mode register MDSR beforehand. By way of example, the data is written into the mode register MDSR in accordance with a command. More specifically, the command to the effect of setting data in the mode register MDSR is supplied from the MPU 1 to the drawing processor 4. In response to the command, the control circuit CONT forms the control signal $C_m$ and brings the input/output circuit IOP into the input mode. In this input mode, the IOP delivers subsequently supplied data from the MPU 1, to the internal write bus WBB. On the other hand, the mode register MDSK accepts the data of the internal bus WBB as mode data in response to the control signal $C_m$. The comparison mode is determined by the plurality of bits in the accepted mode data. In addition, a mode control signal SUB to be described later is formed by one bit remaining in the mode data.

The picture operation circuit LU executes various logical operations and arithmetical operations in bit unit (in pixel unit) or in three-primary-color unit. By way of example, the addition operation processing between the picture of the foundation which would be displayed and a desired superposed picture is executed, and video data information comprising a long-word unit to be written into the frame buffer 3 is formed by the picture operation circuit LU. On this occasion, when a multiplexer or the like is jointly used as will be described later, bits designated by the mask register MSK are inhibited from being written into the frame buffer 3. Thus, in the writing into the frame buffer 3 in long-word unit, the processing of masking parts at which no valid pixel exists can be executed as indicated by marks "x" (in original data, not in data obtained by operations) as in FIG. 4.

FIG. 1 shows a practicable example of a preferable logic circuit arrangement of an arithmetical operation unit within the picture operation circuit LU.

The arithmetical operation unit of this embodiment comprises known full adders ADD as unit adders connected in series in a number of, for example, 32. That is, the full adders ADD are so connected that the carry output $C_{out}$ of the full adder $ADD_i$ (i=0-30) at a lower bit is applied to the carry input terminal $C_{in}$ of the full adder $ADD_{i+1}$ at an upper bit. Thus, for video data whose length is up to 32 bits (one long word), arithmetical operations can be executed in parallel.

A plurality of clocked inverters which are included in the arithmetical operation unit operate so that, when a low level is supplied to its control node, it falls into a nonoperating state (cut off) in which its output node is in a floating state. In contrast, when a high level is supplied to the control node, the clocked inverter falls into an operating state, and it delivers from the output node a signal the phase of which is inverted to that of a signal supplied to the input node.

Addition/subtraction switching circuits $ASC_i$ and $ASC_i'$ (i=0-31), each of which is configured of two inverters $INV_1$ and $INV_2$ connected in series with each other and a single clocked inverter $INV_3$, are respectively connected to the carry input terminal $C_{in}$ and first data input terminal $A_{in}$ of the full adders $ADD_i$ (i=0-31). A power source voltage $V_{cc}$ for fixing the level of the carry input terminal $C_{in}$, and input data $S_i$ (i=0-31) are respectively supplied to the addition/subtraction switching circuits $ASC_i$ and $ASC_i'$. The input data $S_i$ is supplied from the internal bus CLB as shown in FIG. 3. By way of example, it is the source data shifted by the barrelshifter BRLSFT and delivered from the register DLB to the above internal bus CLB as described with reference to FIGS. 3 and 4. One ($INV_2$) of the aforementioned two inverters connected in series is constructed of a clocked inverter, and this clocked inverter $INV_2$ and the clocked inverter $INV_3$ are controlled by the mode control signal SUB. This mode control signal SUB is formed by the predetermined one of the bits of the mode register MDSR. By way of example, when "1" is written into the bit by the method described before, the mode control signal SUB becomes the high level, and when "0" is written into the bit, the mode control signal SUB becomes the low level. Moreover, the bit can be externally set through the external terminal $T_{cd}$ as stated before. When the mode control signal SUB is set at the high level, the clocked inverter $INV_2$ of the addition/subtraction switching circuit $ASO_0$ has its control node supplied with the mode control signal of the low level SUB through an inverter and is therefore cut off, and the clocked inverter $INV_3$ thereof having its control node supplied with the mode control signal of the high level SUB is turned on. Therefore, the carry input terminal $C_{in}$ of the unit calculator $ADD_0$ is supplied with a signal which has been produced in such a way that the output signal of the addition/subtraction switching circuit $ASC_0$ with its phase inverted relative to the level of the power source voltage $V_{cc}$ has its phase further inverted by an inverter. That is, the carry input terminal $C_{in}$ of the unit calculator $ADD_0$ is supplied with the signal of the $V_{cc}$ level. Besides, on the basis of the high level of the mode control signal SUB, the input data (source data) $S_0$ has its phase inverted by the addition/subtraction switching circuit $ASC_0'$, and is then supplied to the first data input terminal $A_{in}$ of the unit adder $ADD_0$. The unit adder/subtracter $ADD_0$ operates as a subtracter because it is supplied with the signal of the level of the power source voltage $V_{cc}$ from the addition/subtraction switching circuit $ASC_0$.

On the other hand, when the mode control signal SUB is set at the low level, the clocked inverter $INV_3$ is cut off, and the clocked inverter $INV_2$ is turned on. Therefore, the carry input terminal $C_{in}$ or the unit calculator $ADD_0$ is supplied with a signal the level of which is phase-inverted relative to the power source voltage $V_{cc}$, by the addition/subtraction switching circuit $ASC_0$ and the inverter receiving the output thereof. Besides, the input data (source data) $S_0$ is passed through the addition/subtraction switching circuit $ASC_0$, without any change and then supplied to the first data input terminal $A_{in}$ of the unit adder $ADD_0$. That is, data which is in phase with the source data $S_0$ is supplied to the first data input terminal $A_{in}$ by the inverters $INV_1'$ and $INV_2'$ in the switch circuit $ASC_0'$. The unit adder/subtracter $ADD_0$ operates as an adder because it is supplied with the signal of the level (the ground potential of circuitry) inverted relative to the power source voltage $V_{cc}$, from the addition/subtraction switching circuit $ASC_0$.

Regarding each of the unit adders $ADD_1$–$ADD_{31}$ other than the unit adder $ADD_0$ of the least significant bit as thus far described, a gate circuit $G_1$ (i=1–31) constructed of a clocked inverter is interposed between the carry input terminal $C_{in}$ of the unit adder $ADD_i$ (i=1–31) and the addition/subtraction switching circuit $ASC_i$ (i=1–31) on the side of this carry input terminal $C_{in}$. Regarding the unit adders $ADD_0$–$ADD_{30}$, a gate circuit $GT_i$ (i=0–30) which is configured of two inverters $INV_4$ and $INV_5$ connected in series with each other is interposed between the carry output terminal $C_{out}$ of the unit adder $ADD_i$ (i=0–30) of the lower bit and the carry input terminal $C_{in}$ of the full adder $ADD_{i+1}$ of the upper bit. One $INV_5$ of the inverters constituting the gate circuit $GT_i$ is constructed of a clocked inverter, and this inverter $INV_5$ and the gate circuit $G_{i+1}$ are turned on/off by the state of data which is set in a flip-flop $FF_i$ (i=0–30) constituting a condition setting register. More specifically, the control node of the clocked inverter constructing the gate circuit $G_{i+1}$ is controlled by a signal obtained in such a way that the output of the flip-flop $FF_i$ has its phase inverted by an inverter $INV_6$, while the control node of the clocked inverter $INV_5$ in the gate circuit $GT_i$ is controlled by the output itself of the flip-flop $FF_i$. In other words, the gate circuit $G_{i+1}$ and the clocked inverter $INV_5$ in the gate circuit $GT_i$ are complementarily turned on and off by the output of the flip-flop $FF_i$.

More concretely, when "1" is set in the flip-flop $FF_i$, the gate circuit $GT_i$ is enabled, and the gate circuit $G_{i+1}$ is disabled. Therefore, the carry output signal of the full adder $ADD_i$ at the lower bit is propagated to the carry input terminal $C_{in}$ of the full adder $ADD_{i+1}$ at the adjoining upper bit. Accordingly, when the set values of the flip-flops $FF_0$–$FF_{30}$ are all "1's", the 32 unit adders $ADD_0$–$ADD_{31}$ connected in series operate as an adder or subtracter of 32 bits.

On the other hand, when "0" is set in the flip-flop $FF_i$ (for example, $FF_0$), the gate circuit $GT_i$ ($GT_0$) is disabled, and the gate circuit $G_{i+1}$ ($G_1$) is enabled. Therefore, the carry input terminal $C_{in}$ of the unit adder $ADD_{i+1}$ ($ADD_1$) is fixed to the low level (the ground potential of the circuitry) or the high level (the power source voltage $V_{cc}$) in accordance with the potential of the mode control signal SUB. Thus, the unit adder $ADD_i$ ($ADD_0$) and the adjacent unit adder $ADD_{i+1}$ ($ADD_1$) of the upper bit are electrically isolated, and they operate as adders/subtracters independent of each other. That is, when the set value of the flip-flop $FF_i$ is "0", the unit adder $ADD_i$ operates as the calculator of the most significant bit, and the unit adder $ADD_{i+1}$ operates as the calculator of the least significant bit.

Accordingly, when "0's" numbering n are set in the register CHOR configured of the flip-flops $FF_0$–$FF_{30}$, the unit adders $ADD_0$–$ADD_{31}$ are divided into (n+1) calculators which are electrically independent of one another. If the set values of the register CHOR are all "0's", the individual full adders operate as separate calculators. Thus, in processing the video data items, the operations in three-primary-color unit are permitted while avoiding interferences that could result from carrys or borrows.

Further, the second data input terminal $B_{in}$ of the unit adder $ADD_i$ is supplied with input data $D_i'$. The input data $D_i'$ is supplied from the internal bus RDB as shown in FIG. 3. By way of example, the destination data loaded from the address buffer 3 in the read data register RDBR as described with reference to FIGS. 3 and 4 are supplied as the input data $D_i'$ to the second data input terminal $B_{in}$ of the unit adder $ADD_i$. The output terminal $D_{out}$ and second data input terminal $B_{in}$ of the unit adder $ADD_i$ are coupled to the input terminals of the multiplexer CHC. This multiplexer CHC is controlled by the mask data supplied through the internal mask bus MSKB. Thus, it delivers as operated result data $DO_i$ either the output data $D_i$ of the unit adder $ADD_i$ or the destination data $D_i$ selectively in accordance with the mask data as explained above. Regarding a bit designated by the mask data to be masked (the bit corresponds to, for example, $D_1$ and $D_1'$), the multiplexer CHC delivers the destination data $D_i$ ($D_1'$) as the operated result data $DO_i$ ($DO_1$), and regarding a bit not designated by the mask data to be masked (the bit corresponds to, for example, $D_0$ and $D_0'$), the multiplexer CHC delivers the output data $D_i$ ($D_0$) of the unit adder $ADD_i$ ($ADD_0$) as the operated result data $DO_i$ ($DO_0$).

The operated result data $DO_i$ (i=0–31) delivered from the multiplexer CHC is supplied to the write data register WDBR as shown in FIG. 3. In the superposition drawing, it is supplied to the frame buffer 3 through the write data register WDBR and is written therein as new destination data.

The condition setting register CHOR configured of the flip-flops $FF_0$–$FF_{30}$ is connected to the internal bus WBB as shown in FIG. 3, and is adapted to have data set therein freely by the MPU disposed outside. By way of example, the data is set in the condition setting register CHOR by the same method as the method of setting the data in the mode setting register MDSR. More specifically, a command to the effect of setting data in the condition setting register CHOR is sent from the microprocessor MPU to the drawing processor 4. In response to the command, the control circuit CONT within the drawing processor 4 forms the control signal $C_c$ and brings the input/output circuit IOP into the input mode. Thus, the data subsequently sent from the MPU 1 to the drawing processor 4 is transmitted to the internal bus WBB through the I/O circuit IOP. In response to the control signal $C_c$, the condition setting register CHOR loads the data on the internal bus WBB as the set data. In this way, the data setting in the condition setting register CHOR is done from outside the drawing processor 4.

Now, there will be described practicable procedures in the case where video data items are processed in three-primary-color units by the arithmetical operation unit of this embodiment.

Figure 5A:
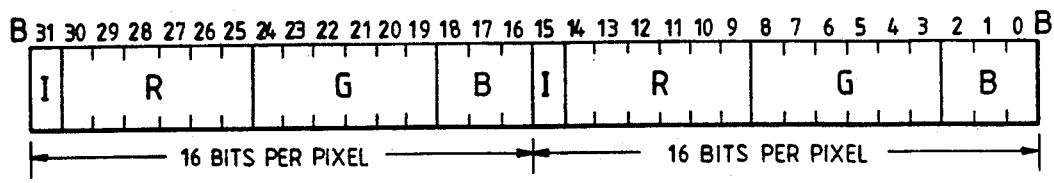
FIGS. 5(A), 5(B), 5(C) and 5(D) are explanatory diagrams exemplifying the format of video data, and conditions to be set in a register which serves to alter the construction of the arithmetical operation unit in FIG. 1 in accordance with the video data; and, FIGS. 6 and 7 are logic circuit diagrams each showing another embodiment of the arithmetical operation unit.

FIG. 5(A) shows the bit format of a video data item which is stored in the frame buffer 3. In this embodiment, the number of bits which can be read or written at one time when the frame buffer 3 is once accessed by the drawing processor 4 is 32 bits (one long word), by which two pixels are expressed. A plurality of such video data items are stored in the frame buffer 3. Incidentally, although four pixels have been expressed by one long word in FIG. 4, this embodiment shows for brevity and ease of illustration a case where two pixels are expressed by one long word.

In the example shown in FIG. 5(A), the video data item of one pixel is composed of 16 bits, in which the bits $B_0$-$B_2$ are assigned to blue B among the three primary colors, the bits $B_3$-$B_8$ to green G, the bits $B_9$-$B_{14}$ to red R, and the bit $B_{15}$ to information expressive of an intensity I.

Since the video data items of one pixel is composed of 16 bits, video data items corresponding to two pixels can be simultaneously processed by the use of the arithmetical operation unit of 32 bits in this embodiment.

Figure 5B:
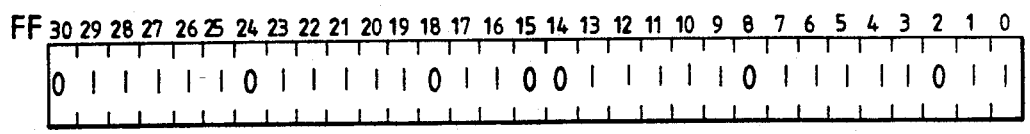

In a case where the video data items of 32 bits defined as stated above (refer to FIG. 5(A)) is to be processed for every element, namely, every color information (blue, green or red), the data as shown in FIG. 5(B) is set in the register $FF_0$-$FF_{30}$ in the arithmetical operation unit of FIG. 1. That is, the data shown in FIG. 5(B) is sent from the MPU 1 and set in the condition setting register CHOR by the method described before. As seen from the figure, "0's" are set in the flip-flops $FF_2$, $FF_8$ and $FF_{14}$; and $FF_{18}$, $FF_{24}$ and $FF_{30}$ corresponding to the most significant bits of the respective elements B, R and G (blue, red and green). Besides, since the intensity information is of 1 bit per pixel, the flip-flop $FF_{15}$ corresponding to the bit $B_{15}$ expressive of the intensity I is also set to "0". Further, the remaining flip-flops are set to "1".

The unit adder $ADD_{31}$ corresponding to the most significant bit $B_{31}$ does not have its carry output supplied to any other unit adder. In this embodiment, no unit adder for receiving the carry output of the unit adder $ADD_{31}$ is originally provided. Therefore, no flip-flop is provided for determining whether or not the carry output of the unit adder $ADD_{31}$ is transmitted to the next stage. Accordingly, the number of bits of the condition setting register CHOR is smaller than the total number of the unit adders. This poses no problem because of the nonexistence of any unit adder for receiving the carry output of the unit adder corresponding to the most significant bit.

In addition, the aforementioned data to be set in the condition setting register CHOR is supplied from the MPU in a 32-bit unit. In this case, the most significant bit $B_{31}$ (not shown in FIG. 5(B)) is not set in any flip-flop. FIG. 5(B) can also be regarded as indicating the content of the condition setting register CHOR.

When the condition setting register CHOR configured of the flip-flops $FF_0$-$FF_{30}$ is set as illustrated in FIG. 5(B), the unit adders $ADD_0$-$ADD_{31}$ are electrically divided into an adder/subtracter of 3 bits, two adders/subtracters of 6 bits, an adder/subtracter of 1 bit, an adder/subtracter of 3 bits, two adders/subtracters of 6 bits and adder/subtracter of 1 bit in this order from the side of the least significant bit.

Thus, for the video data item the bit format of which is as shown in FIG. 5(A) every element is permitted to be processed without interference from another element.

More specifically, when the command to the effect of executing the superposition drawing is sent from the MPU 1 to the drawing processor 4, this drawing processor 4 controls the execution unit EXEC in response to the command.

Figure 5C:
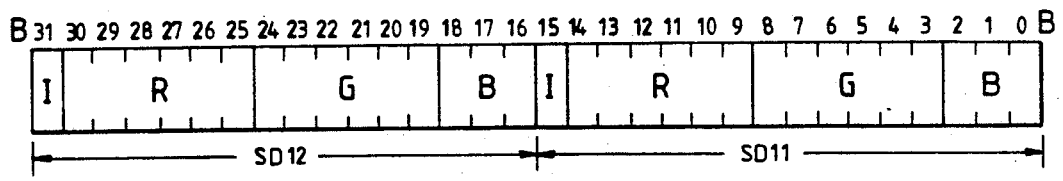
Figure 5D:
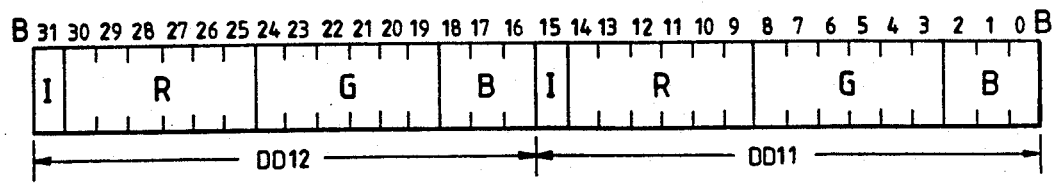

As described with reference to FIGS. 3 and 4, the source data read out of the frame buffer 3 and shifted by the barrel shifter BRLSFT is transmitted to the internal bus CLB. The source data $S_i$ on the internal bus CLB is supplied to the first data input terminals $A_{in}$ of the unit adders $ADD_i$ through the addition/subtraction switching circuits $ASC_i'$. FIG. 5(C) shows the bit format of the source data which is supplied to the unit adders $ADD_i$ through the addition/subtraction switching circuits $ASC_i'$. On the other hand, the destination data $D_i'$ read out of the frame buffer 3 is supplied to the second data input terminals $B_{in}$ of the unit adders $ADD_j$ through the internal read bus RDB. The bit format of the destination data $D_i'$ is illustrated in FIG. 5(D).

Besides, the data as shown in FIG. 5(B) is set in the condition setting register CHOR by the method described before, and the mode control signal SUB is rendered as the low level so as to operate the unit adders/subtracters as adders by way of example. In order to bring the mode control signal SUB to the high level, the data is set in the mode setting register MDSR in the way as stated before.

Thus, the color information of blue in the source data $SD_{11}$ (expressing one pixel of the source side picture) and the color information of blue in the destination data $DD_{11}$ (expressing one pixel of the destination side picture) are added by the unit adders $ADD_0$-$ADD_2$, the color information of green in the source data $SD_{11}$ and the same in the destination data $DD_{11}$ are added by the unit adders $ADD_3$-$ADD_8$, the color information of red in the source data $SD_{11}$ and the same in the destination data $DD_{11}$ are added by the unit adders $ADD_9$-$ADD_{14}$, and the intensity information in the source data $SD_{11}$ and the same in the destination data $DD_{11}$ are added by the unit adder $ADD_{15}$. Likewise, the blue information of the source data $SD_{12}$ and that of the destination data $DD_{12}$ are added by the unit adders $ADD_{16}$-$ADD_{18}$, the green information of the source data $SD_{12}$ and that of the destination data $DD_{12}$ are added by the unit adders $ADD_{19}$-$ADD_{24}$, the red information of the source data $SD_{12}$ and that of the destination data $DD_{12}$ are added by the unit adders $ADD_{25}$-$ADD_{30}$, and the intensity information of the source data $SD_{12}$ and that of the destination data $DD_{12}$ are added by the unit adder $ADD_{31}$.

The video data items $D_i$ (i=0-31) obtained by such adding operations in binary numbers (in digital fashion) are supplied to the input nodes of the multiplexer CHC on one side thereof. By way of example, when the mask data designating to mask none of the bits is supplied from the mask register MSK to the multiplexer CHC through the internal mask bus MSKB, this multiplexer CHC delivers the above video data $D_i$ as the destination data $DO_i$ (i=0-31). The delivered destination data $DO_i$ is written into the frame buffer 3 as new destination data through the write data register WDBR.

In executing subtractions, the mode setting register MDSR is set by the external MPU 1 so as to render the mode control signal SUB as the high level, as described before. Besides, in a case where a predetermined bit is designated by the mask data so as to be masked, the bit of the video data $D_i$ corresponding to the predetermined bit is not delivered from the multiplexer CHC, and instead, the corresponding bit of the destination data $D_i'$ is delivered from the multiplexer CHC.

In the description concerning FIG. 3, FIG. 4, etc., main reference has been to the case where the source data and the destination data are digital data expressive of the pixels of the two pictures which are to be superposed on each other and then displayed. However, the source data (or destination data) may well be digital data expressive of the pixel or predetermined color of a picture which serves as the foundation in the display.

The above embodiment has referred to the case of processing the video data of 16 bits in which 3 bits are assigned to blue, 6 bits to each of green and read, and 1 bit to the intensity. According to the arithmetical operation unit in FIG. 1, however, the arrangement can be altered by changing the set values of the condition setting register CHOR (flip-flops $FF_0$-$FF_{30}$), so as to process video data in any desired bit format, e.g., a bit format in which 4 bits are assigned to each of the blue, green, red and intensity information items.

Further, the bit length of video data is not restricted to 16 bits only, but data of 32 bits, 8 bits or 4 bits can also be coped with. It is possible to simultaneously process 4 pixels for the 8-bit length and 8 pixels for the 4-bit length.

Meanwhile, in the adder/subtracter unit in which the full adders are connected in series as described above, the operated result at the upper bit does not settle before the carry output of the adder at the lower bit becomes definite. This leads to the drawback that a period of time required for obtaining the operated result prolongs more as the number of bits of the adders/subtracters is larger.

Figure 6:
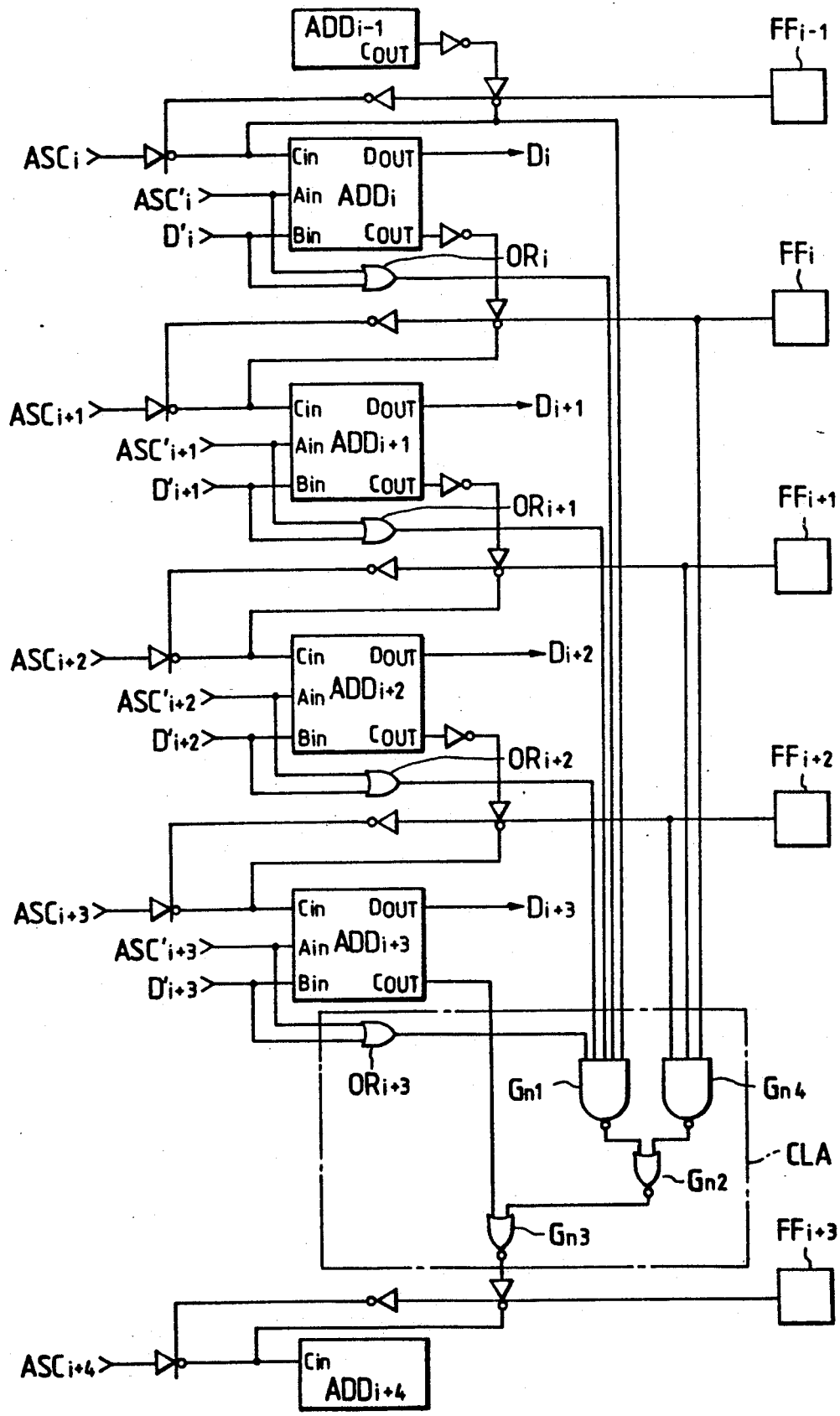

FIG. 6 shows another embodiment of the present invention, which is an example of the logic arrangement of an arithmetical operation unit that overcomes the aforementioned drawback and attains a higher operating speed. In the figure, portions similar to those of the embodiment in FIG. 1 are denoted by the same symbols.

The circuit arrangement in FIG. 6 is exemplified as being additionally provided with a carry look-ahead circuit CLA in which, by reference to the respective carries of any desired full adders $ADD_i$-$ADD_{i+3}$ of 4 bits, a carry signal to enter the carry input terminal $C_{in}$ of a full adder $ADD_{i+4}$ at the fifth bit is determined by an anticipating method.

The carry look-ahead circuit CLA is constructed with note taken of the fact that, in a case where full adders $ADD_{i-1}$-$ADD_{i+4}$ are coupled in series so as to operate as adders, a carry input (="1") applied to the lower-bit full adder $ADD_i$ is propagated as the carry to the full adder $ADD_{i+4}$ when (as a condition A) any of the input data items $A_{in}$ or $B_{in}$ of the full adders $ADD_i$-$ADD_{i+3}$ is "1". In order to immediately find whether or not the condition A is satisfied, the respective full adders $ADD_i$-$ADD_{i+3}$ are provided with OR gates $OR_i$-$OR_{i+3}$, each of which receives the input data items $A_{in}$ and $B_{in}$. Besides, a NAND gate $Gn_1$ which receives the outputs of the OR gates $OR_i$-$OR_{i+3}$ is provided, and the output of this NAND gate $Gn_1$ is applied to the carry input terminal $C_{in}$ of the full adder $ADD_{i+4}$ through NOR gates $Gn_2$ and $Gn_3$.

Further, the arithmetical operation unit of this embodiment is provided with a NAND gate $Gn_4$ which receives the outputs of flip-flops $FF_i$-$FF_{i+2}$ constituting the condition setting register CHOR stated before and whose output is supplied to the input terminal of the NOR gate $GN_2$ along with the output of the NAND gate $Gn_1$, in order that the carry look-ahead circuit CLA may effectively operate even when the condition setting register CHOR is provided so as to electrically divide the full adders $ADD_{i-11}$-$ADD_{i+4}$ at any desired bit positions in the same manner as in the circuit of the embodiment in FIG. 1.

Thus, even in a case where the condition A is held in the full adders $ADD_{i-1}$-$ADD_{i+1}$ of the bits lower than the bit (i+2), when "0" is set in only the flip-flop $FF_{i+1}$, by way of example, the output of the NAND gate $Gn_4$ becomes a high level, thereby to fix the output of the NOR gate $Gn_3$ to a low level, and the output of the NAND gate $Gn_1$ which generates the carry signal upon the holding of the condition A is prevented from being propagated to the full adder $ADD_{i+4}$ of the succeeding stage.

Owing to the provision of the carry look-ahead circuit CLA of the above arrangement, the carry signal which is otherwise propagated through the full adders of 4 stages is propagated to the upper bit with only a delay corresponding to the two stages of the NAND gate and the NOR gate, so that the operating speed is sharply heightened.

Although, in this embodiment, the carry look-ahead circuit corresponding to the full adders of 4 bits has been exemplified, a carry look-ahead circuit corresponding to another bit length such as 5 bits or 6 bits may well be additionally provided on the basis of the same concept.

As a further improvement, carry look-ahead circuits corresponding respectively to 2 bits and 8 bits are connected in addition to and in parallel with the aforementioned carry look-ahead circuit CLA corresponding to 4 bits, and a signal obtained by finally taking the OR of the outputs of all the carry look-ahead circuits is used as the carry signal of the succeeding stage. With this measure, even when the arithmetical operation unit is divided midway of its bits corresponding to the carry lookahead circuits by the condition setting register CHOR, the carry signal is quickly produced from any of the carry look-ahead circuits, whereby the operating speed can be heightened still more.

Figure 7:
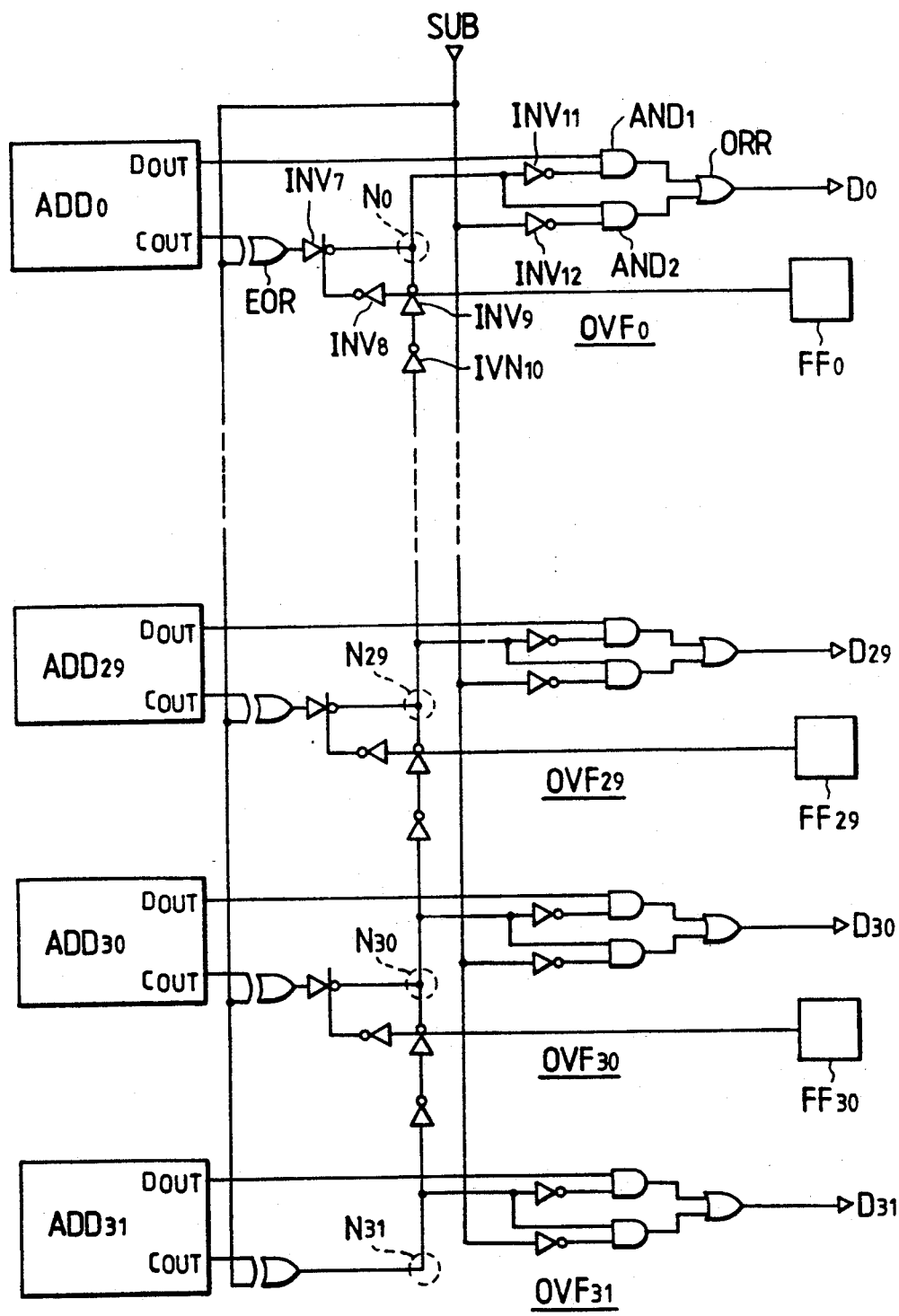

FIG. 7 shows yet another embodiment of the present invention. In the figure, portions functioning similarly to those of the embodiment in FIG. 1 have the same symbols as in FIG. 1 affixed thereto. The embodiment in FIG. 7 is additionally provided with overflow prevention circuits $OVF_i$ (i=0-31) each comprising logic gates in combination, at stages succeeding respective full adders $ADD_0$-$ADD_{31}$, in order that when an operated result has given rise to an overflow in each of electrically divided operation units, all the bits of the unit adders in the divided section may be forcibly switched to "1's" (high level) in the addition mode and to "0's" (low level) in the subtraction mode. The overflow prevention circuit $OVF_i$ is configured of an exclusive OR circuit EOR, inverters $INV_7$-$INV_{12}$, AND circuits $AND_1$-$AND_2$ and an OR circuit ORR. Among the inverters $INV_7$-$INV_{12}$ of the overflow prevention circuit $OVF_i$, those $INV_7$ and $INV_9$ are clocked inverters. The inverters $INV_7$-$INV_{10}$ constitute a circuit which prevents an overflow signal from being transmitted from the overflow prevention circuit $OVF_{i+1}$ of the upper bit. Besides, this circuit operates so that the overflow signal of the corresponding bit may be transmitted to the overflow prevention circuit $OVF_{i-1}$ of the lower bit when the supply of the overflow signal from the upper bit overflow prevention circuit $OVF_{i+1}$ has been prevented. That is, this circuit operates as a switch circuit. The operation of the switch circuit, namely, whether the overflow signal from the upper bit is received or the overflow signal of its own bit is transmitted to the lower bit, is determined by data set in the condition setting register CHOR (flip-flops $FF_0$-$FF_{30}$).

As understood from the above description, the overflow prevention circuit $OVF_{31}$ of the most significant bit is not provided with the switch circuit.

Operated results are sometimes incorrect as exemplified below: In a case where the operation of adding 8 (in the decimal notation) to 8 (ditto) is executed by an arithmetical operation unit for the operations of plus integers having a length of 4 bits, the result of the operation ought to be 16 (in the decimal notation), but it cannot be expressed by 4 bits, so that the output of the adder might become 0. Besides, a result which ought to be obtained by subtracting 5 (in the decimal notation) from 4 (ditto) is −1 (ditto), but the arithmetical operation unit cannot handle minus numbers, so that the result of the subtraction might become 15 (in the decimal notation). In view of these drawbacks, in cases where, in the addition mode, the sum is greater than a value for which all the bits of the operation unit become "1's" and where, in the subtraction mode, the difference is less than a value for which all the bits become "0's", the items of the output data of the operation unit are respectively fixed to the maximum value and the minimum value capable of expressing the operated results.

When the mode control signal SUB is rendered to the low level to designate the addition mode, the exclusive OR circuit EOR in the overflow prevention circuit $OVF_{31}$ delivers "1" in response to the carry output ($C_{out}$=1) of the adder $ADD_{31}$. Thus, the output of the OR circuit ORR in this circuit $OVF_{31}$ is fixed to "1". On the other hand, when the mode control signal SUB is rendered to the high level to designate the subtraction mode, the exclusive OR circuit EOR in the overflow prevention circuit $OVF_{31}$ delivers "0" in response to the borrow output ($C_{out}$=0) of the adder $ADD_{31}$. In consequence, the output of the OR circuit ORR in this circuit $OVF_{31}$ is fixed to "0".

The operations of the above switch circuits which are controlled by the data of the condition setting register ($FF_0$-$FF_{31}$) will be readily understood from the operations of the switch circuits in FIG. 1.

The circuit arrangement of this embodiment has the following significance in, for example, a graphic processor: In a case where the ordinary addition mode is employed for superposing video data, the operated result of the superposition between bright pictures can overflow to display a dark picture. However, in a case where the bright pictures are optically superposed, a resulting picture does not usually become dark. In order to approximate this state, the circuit arrangement as shown in FIG. 7 is effectively applied on the occasion of the overflow. Incidentally, the circuit arrangement is not always required, but it may be additionally provided as is needed. Moreover, a change-over system can be adopted so that the circuit arrangement may operate only when needed. The change-over system may be realized by disposing, for example, a new register so as to fix nodes $N_0$-$N_{31}$ (indicated in FIG. 7) to the low level in accordance with the output thereof. When the nodes $N_0$-$N_{31}$ are fixed to the low level, the overflow preventing function stated above can be ceased. Of course, any of the registers already included may well be used instead of the aforementioned new register.

As described above, according to each of the embodiments, a drawing processor comprises, besides a logical operation unit for executing logical operations of video data, an arithmetical operation unit including an arithmetic circuit in which unit adders for executing additions/subtractions at respective bits constitutive of the video data are connected in series. The operation unit also includes switch circuits which are respectively connected between the adjacent unit adders and each of which can propagate or intercept a carry signal from the lower bit to the upper bit, and condition setting means, such as a register adapted to be externally set, for generating control signals for the respective switch circuits. Therefore, a plurality of addition circuits each of which is composed of any desired number of bits can be constructed in such a way that propagation paths for the carry signals between any desired ones of the unit adders constituting the arithmetic circuit are blocked by externally setting data in the condition setting means, and a carry or borrow is prevented from being transmitted between the color information items of three primary colors, in such a way that the addition/subtraction processing of the color information items of the same color is executed by each of the divided addition circuits. Thus, the embodiment brings forth the effect that a copious color display can be presented while interferences among the three primary colors are prevented.

Although, in the above, the invention made by the inventor has been concretely described in conjunction with the embodiments, it is needless to say that the present invention is not restricted to the foregoing embodiments, but that it can be variously altered within a scope not departing from the purport thereof. In a case where the embodiment depicted in FIG. 1 or FIG. 6 is furnished with the overflow prevention circuit as shown in FIG. 7, the condition setting register in FIG. 1 or FIG. 6 can be used also as the condition setting register included in the overflow prevention circuit in FIG. 7. Besides, although in each of the embodiments, the register configured of the flip-flops is employed as the condition setting means for altering the construction of the arithmetical operation unit, any circuit arrangement capable of storing conditions can be adopted without restrictions, and by way of example, a nonvolatile memory device such as EPROM or program elements such as fuses may well be used.

Further, the frame buffer 3 which is disposed outside may well be replaced with an internal memory which is built in the drawing processor 4. In order to realize this construction, FIG. 3 shows an internal address bus RAM-ADD for supplying memory addresses to the internal memory (not shown), and an internal data bus RAM-DBS for transferring data to and from the internal memory.

Also in FIG. 3, the condition setting register CHOR is coupled to the input/output circuit IOP through the internal bus UBB so that the data set in the register CHOR may be externally derived (read out). Thus, when a command for reading out the data of the condition setting register CHOR is given to the drawing processor 4, the set data can be read out through the external terminal $T_{cd}$. The control circuit CONT controls this operation in response to the command.

Although, in the foregoing, the invention made by the inventor has been chiefly described as to the applications thereof to the drawing processor forming the background field of the invention, it is also applicable to a graphic controller LSI in which the drawing processor, and a display processor, a timing processor etc., are formed on a single chip.

The invention has been described with reference to the preferred embodiments. Obviously, modifications and alterations will occur to others upon the reading and understanding of the specification. It is our intention to include all such modifications and alterations insofar as they come within the scope of the appended claims or the equivalents thereof.

Having thus described our invention, we now claim:

1. A drawing processor for processing video data comprising:
    mode setting means for indicating the number of data per pixel;
    arithmetical operation means, including a plurality of unit operation means, for performing a predetermined operation for the data;
    mode means, coupled to said mode setting means and to said plurality of unit operation means, for electrically dividing said plurality of unit operation means into a plurality of groups each of which includes unit operation means, wherein the number of the unit operation means included in each of said groups corresponds to the number indicated by said mode setting means;
    condition setting means for indicating the number of group color data in each three-primary-color data comprising the data per pixel for defining color of a pixel; and,
    condition means, coupled to said condition setting means, for electrically dividing the unit operation means in each of said plurality of groups into at least three groups in accordance with the indication by the condition setting means so as to inhibit an information transfer between said three groups.

2. The drawing processor according to claim 1, wherein said mode setting means includes first storage means for storing data for indicating the number of data per pixel, and said condition setting means includes second storage means for storing data for indicating the number of group color data in each three-primary-color data defining a color of a pixel.

3. A drawing processor according to claim 2, wherein said first storage means is a part of a register, and said second storage means is another part of said register.

4. A drawing processor according to claim 1, wherein said mode means includes at least one first switching means coupled between predetermined unit operation means, and said condition means includes at least one second switching means coupled between predetermined unit operation means.

5. A drawing processor according to claim 4, wherein said mode setting means includes first storage means for storing data for controlling said first switching means, and said condition setting means includes second storage means for storing data for controlling said second switching means.

6. A drawing processor according to claim 5, wherein said first storage means is a part of a register and said second storage means is a part of said register.

7. In a system including a microprocessor and a drawing processor coupled to said microprocessor, said drawing processor comprising:
    mode setting means for indicating the number of data per pixel;
    arithmetical operation means, including a plurality of unit operation means, and for performing a predetermined operation for data;
    mode means, coupled to said mode setting means and to said plurality of unit operation means, and for electrically dividing said plurality of unit operation means into a plurality of groups each of which includes unit operation means, wherein the number of the unit operation means included in each of said groups corresponds to the number indicated by said mode setting means;
    condition setting means for indicating the number of data in each three-primary-color data defining color of a pixel; and
    condition means coupled to said condition setting means, for electrically dividing the unit operation means in each of said plurality of groups into at least three groups in accordance with the indication by said condition setting means so as to inhibit an information transfer between said three groups.

8. A system according to claim 7, wherein said mode setting means includes first storage means for storing data for indicating the number of data per pixel, and said condition setting means includes second storage means for storing data for indicating the number of data in each three-primary-color data defining color of a pixel.

9. A system according to claim 8, wherein said first storage means is a part of a register, and said second storage means is another part of said register.

10. A system according to claim 7, wherein said mode means includes at least one first switching means coupled between first selected unit operation means, and said condition means includes at least one second switching means coupled between second preselected unit operation means.

11. A system according to claim 10, wherein said mode setting means includes first storage means for storing data for controlling said first switching means, and said condition setting means includes second storage means for storing data for controlling said second switching means.

12. A system according to claim 11, wherein said first storage means is a part of a register and said second storage means is another part of said register.

13. A system according to claim 12, wherein said register is accessed by said microprocessor.

14. A system according to claim 13, further comprising memory means coupled to said drawing processor for storing the data operated by said arithmetical operation means.

15. A system according to claim 7, wherein each of said mode setting means and said condition setting means is accessed by said microprocessor.

* * * * *